(12) United States Patent
Wu et al.

(10) Patent No.: US 11,263,762 B2
(45) Date of Patent: Mar. 1, 2022

(54) IMAGE RECOGNITION METHOD AND APPARATUS, AND COMPUTER-READABLE STORAGE MEDIUM

(71) Applicant: SENSETIME INTERNATIONAL PTE. LTD., Singapore (SG)

(72) Inventors: Jinyi Wu, Singapore (SG); Haiyu Zhao, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 46 days.

(21) Appl. No.: 16/887,124

(22) Filed: May 29, 2020

(65) Prior Publication Data

US 2021/0201506 A1 Jul. 1, 2021

Related U.S. Application Data

(63) Continuation of application No. PCT/IB2020/053639, filed on Apr. 17, 2020.

(30) Foreign Application Priority Data

Dec. 31, 2019 (SG) .......................... 10201913955V

(51) Int. Cl.
*G06T 7/292* (2017.01)
*G06K 9/46* (2006.01)
*G06T 7/246* (2017.01)

(52) U.S. Cl.
CPC ............ *G06T 7/248* (2017.01); *G06K 9/4609* (2013.01); *G06T 7/292* (2017.01); *G06T 2207/30241* (2013.01)

(58) Field of Classification Search
None
See application file for complete search history.

(56) References Cited

U.S. PATENT DOCUMENTS 9,189,918 B1 11/2015 Gronkowski
10,282,852 B1 5/2019 Buibas et al.
(Continued)

FOREIGN PATENT DOCUMENTS

CN 110266926 A 9/2019
CN 110347772 A 10/2019

OTHER PUBLICATIONS

International Search Report in the international application No. PCT/IB2020/053639, dated Oct. 1, 2020, 5 pgs.

(Continued)

*Primary Examiner* — Idowu O Osifade
(74) *Attorney, Agent, or Firm* — Cooper Legal Group, LLC

(57) ABSTRACT

Image recognition method and apparatus, and computer-readable storage medium are provided. The method includes: determining changed object according to change of states of at least one group of target objects in detection area; obtaining a set of image frames in side view consisting of image frames in side view and at least one image frame to be matched that are collected within a first preset time period before states of at least one group of target objects in detection area are changed; determining associated image frame from at least one image frame to be matched; obtaining image frame in side view corresponding to associated image frame from the set of image frame in side view; and determining, according to associated image frame and the image frame in the side view, target intervention object having the highest degree of association with changed object from at least one intervention object.

20 Claims, 8 Drawing Sheets

(56) References Cited

U.S. PATENT DOCUMENTS

| | | |
|---|---|---|
| 10,460,468 B2 | 10/2019 | Song et al. |
| 11,069,070 B2 | 7/2021 | Buibas et al. |
| 2005/0026680 A1 | 2/2005 | Gururajan |
| 2005/0051965 A1 | 3/2005 | Gururajan |
| 2005/0272501 A1 | 12/2005 | Tran |
| 2007/0111773 A1 | 5/2007 | Gururajan |
| 2014/0092241 A1* | 4/2014 | Brinkman .......... G06K 9/00671 348/135 |
| 2016/0217612 A1* | 7/2016 | Petill ........................ G06T 3/40 |
| 2016/0275367 A1* | 9/2016 | Eliazar ................. G06K 9/6211 |
| 2017/0330414 A1 | 11/2017 | Dallmeier |
| 2019/0188876 A1 | 6/2019 | Song et al. |
| 2019/0384989 A1 | 12/2019 | Yamazaki et al. |
| 2020/0380701 A1 | 12/2020 | Buibas et al. |

OTHER PUBLICATIONS

Written Opinion of the International Search Authority in the international application No. PCT/IB2020/053639, dated Oct. 1, 2020, 5 pgs.

First Office Action of the Singaporean application No. 10201913955V, dated Jan. 23, 2020, 9 pgs.

Notice of Allowance of the Singaporean application No. 10201913955V, dated Sep. 17, 2020, 5 pgs.

* cited by examiner

IMAGE RECOGNITION METHOD AND APPARATUS, AND COMPUTER-READABLE STORAGE MEDIUM

CROSS-REFERENCE TO RELATED APPLICATIONS

The present disclosure is a U.S. continuation application of International Application No. PCT/IB2020/053639, filed on Apr. 17, 2020, which claims priority to Singapore Patent Application No. 10201913955V, filed to the Singapore Patent Office on Dec. 31, 2019 and entitled "IMAGE RECOGNITION METHOD AND APPARATUS, AND COMPUTER-READABLE STORAGE MEDIUM". The contents of International Application No. PCT/IB2020/053639 and Singapore Patent Application No. 10201913955V are incorporated herein by reference in their entireties.

TECHNICAL FIELD

The present disclosure relates to the artificial intelligence field, and in particular, relates to an image recognition method and apparatus, and a computer-readable storage medium.

BACKGROUND

In recent years, with the popularization and development of artificial intelligence technologies, image recognition performed by a computer or camera is applied to more and more scenarios. For example, in current video monitor and image recognition systems, a camera is used to recognize an association relationship between a target object and surrounding multiple intervention objects, such as the saving and fetching relationships between a recognition item and a surrounding person.

SUMMARY

The technical solution of the present disclosure is realized as below:

The embodiments of the present disclosure provide an image recognition method, including:

determining a changed object according to a change of states of at least one group of target objects in a detection area;

obtaining at least one image frame to be matched and a set of image frames in a side view consisting of image frames in the side view that are collected within a first preset time period before the states of the at least one group of target objects in the detection area are changed, wherein the at least one image frame to be matched is obtained by collecting at least one image of the detection area by an image collection device located above the detection area, and the image frames in the side view are obtained by collecting images of the detection area by an image collection device located on a side of the detection area;

determining an associated image frame from the at least one image frame to be matched, wherein the associated image frame comprises an intervention part having a highest degree of association with the changed object;

obtaining an image frame in the side view corresponding to the associated image frame from the set of image frame in the side view, wherein the image frame in the side view corresponding to the associated image frame comprises the intervention part having the highest degree of association with the changed object, and at least one intervention object; and determining, according to the associated image frame and the image frame in the side view corresponding to the associated image frame, a target intervention object having the highest degree of association with the changed object from the at least one intervention object.

The embodiments of the present disclosure provide an image recognition apparatus, including:

a first determining unit, configured to determine a changed object according to a change of states of at least one group of target objects in a detection area;

a first obtaining unit, configured to obtain at least one image frame to be matched and a set of image frames in a side view consisting of image frames in the side view that are collected within a first preset time period before the states of the at least one group of target objects in the detection area are changed, wherein the at least one image frame to be matched is obtained by collecting at least one image of the detection area by an image collection device located above the detection area, and the image frames in the side view are obtained by collecting images of the detection area by an image collection device located on a side of the detection area;

a second determining unit, configured to determine an associated image frame from the at least one image frame to be matched, wherein the associated image frame comprises an intervention part having a highest degree of association with the changed object;

a second obtaining unit, configured to obtain an image frame the side view corresponding to the associated image frame from the set of image frames in the side view, wherein the image frame in the side view corresponding to the associated image frame comprises the intervention part having the highest degree of association with the changed object, and at least one intervention object; and a third determining unit, configured to determine, according to the associated image frame and the image frame in the side view corresponding to the associated image frame, a target intervention object having the highest degree of association with the changed object from the at least one intervention object.

The embodiments of the present disclosure provide an image recognition apparatus, where the image recognition apparatus includes a processor, a memory, and a communication bus; the memory communicates with the processor by means of the communication bus; the memory stores one or more programs that may be executed by the processor; and if the one or more programs are executed, the processor executes the aforementioned image recognition method.

The embodiments of the present disclosure provide a computer-readable storage medium, where the computer-readable storage medium stores the one or more programs, and the one or more programs may be executed by one or more processors to realize the aforementioned any one image recognition method.

DETAILED DESCRIPTIONS

Figure 1:
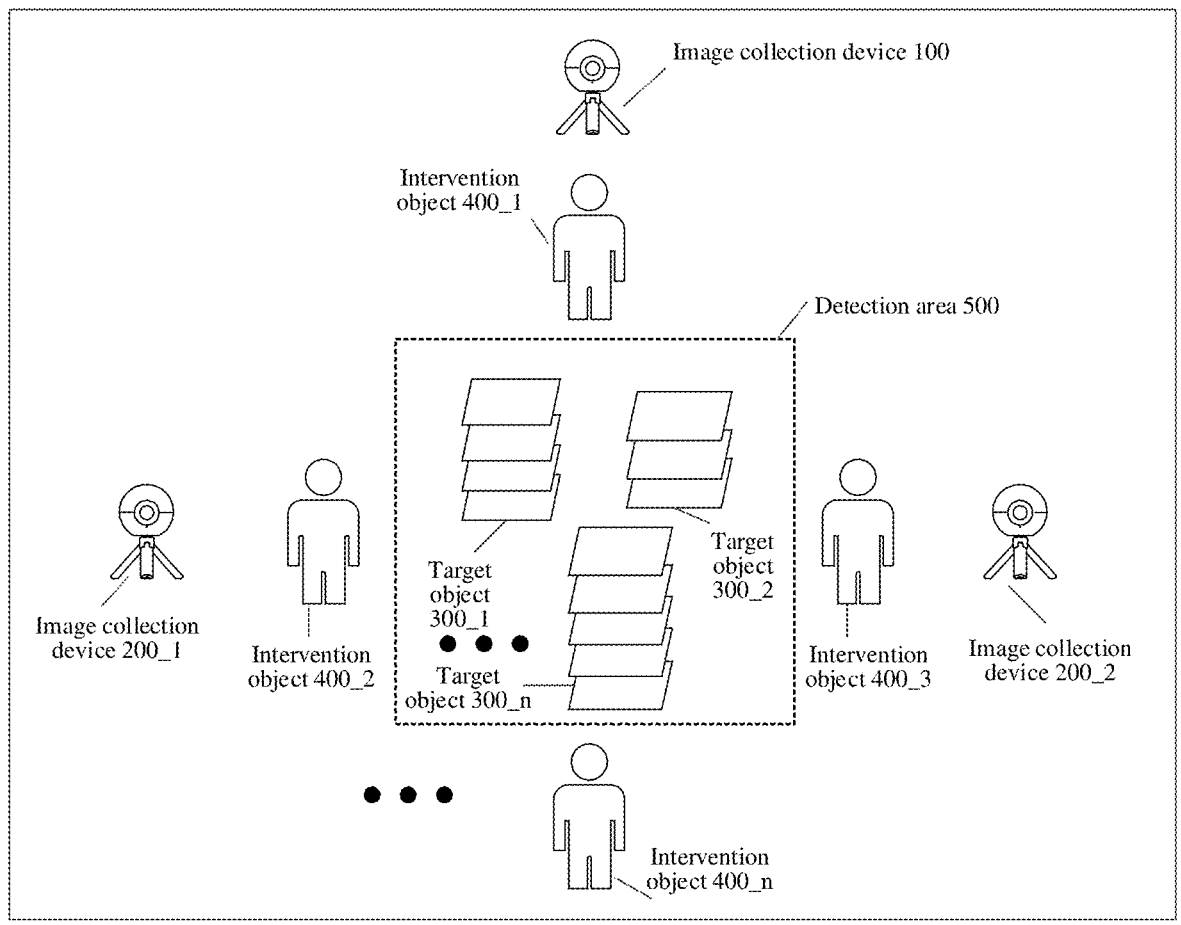
FIG. 1 is a schematic diagram of an image recognition scene provided by the embodiments of the present disclosure.

For current video monitor and image recognition systems, when an existing camera recognizes an association relationship between a target object and surrounding multiple intervention objects, such as the saving and fetching relationships between a recognition item and a surrounding person, the missing of the key information of a collected image causes the problems, such as it is impossible to correctly associate to the intervention object that makes the target object change when the target object is changed, the collected information of the intervention object is incomplete, and it is impossible to match a specific target intervention object according to the information of a part of intervention objects, and finally causes the problem that it is impossible to correctly recognize the target intervention object having the highest degree of association with the target object.

For solving the aforementioned technical problems, embodiments of the present disclosure desire to provide an image recognition method and apparatus, and a computer-readable storage medium, and are capable of improving the accuracy of recognizing a target intervention object. The method includes: determining the changed object according to the change of states of the at least one group of target objects in the detection area; obtaining the set of image frames in the side view consisting of the image frames in the side view and the at least one image frame to be matched that are collected within the first preset time period before the states of the at least one group of target objects in the detection area are changed, where the at least one image frame to be matched is obtained by collecting at least on image of the detection area by the image collection device located above the detection area, and the image frames in the side view are obtained by collecting images of the detection area by an image collection device located on a side of the detection area; determining the associated image frame from the at least one image frame to be matched, where the associated image frame includes the intervention part having the highest degree of association with the changed object; obtaining an image frame in the side view corresponding to the associated image frame from the set of image frame in the side view, where the image frame in the side view corresponding to the associated image frame includes the intervention part having the highest degree of association with the changed object, and the at least one intervention object; and determining, on the basis of the associated image frame and the image frame in the side view corresponding to the associated image frame, the target intervention object having the highest degree of association with the changed object from the at least one intervention object.

The solution is realized by using the aforementioned method. The intervention part having the highest degree of association with the changed object may be obtained from a bird's eye view. Because the position information from the bird's eye view is proportional to actual position information, a positional relationship between the changed object and the intervention part obtained from the bird's eye view is more accurate than that from a side view angle. Furthermore, the associated image frame is combined with the corresponding side view image frame, thereby realizing the determining of the changed object and the intervention part having the highest degree of association with the changed object (the determining based on the associated image frame), further realizing the determining of the intervention part having the highest degree of association with the changed object and the target intervention object (the determining based on the corresponding side view image frame), and thereby determining the target intervention object having the highest degree of association with the changed object, and improving the accuracy of associating the change of the target object with the intervention object.

The technical solutions in the embodiments of the present disclosure are clearly and completely described below with reference to the accompanying drawings in the embodiments of the present disclosure.

The embodiments of the present disclosure provide the image recognition scene. As shown in FIG. 1, FIG. 1 is a schematic diagram of the image recognition scene provided by the embodiments of the present disclosure, including the image collection device 100, which is located above the detection area 500, that generally performs image collection on the detection area at a vertical angle in actual application; and the image collection device 200_1 and the image collection device 200_2, which are located at the sides of the detection area 500, that perform image collection on the detection area at a parallel angle in actual application, where the image collection device 100, the image collection device 200_1, and the image collection device 200_2 continuously detect the detection area 500 according to respective orientations and angles. At least one group of target objects 300_1 to 300_n are placed in the detection area 500, where each group of target objects 300_1 to 300_n are formed by stacking at least one sub object. At least one intervention object 400_1 to 400_n is included around the detection area 500, where the intervention objects 400_1 to 400 are located within the collection range of the image collection device 100, the image collection device 200_1, and the image collection device 200_2. In the image recognition scene provided by the embodiments of the present disclosure, the image collection device may be a moving camera or a still camera, the intervention object may be a person, and the target object may be a stackable item. When a certain person among the persons 400_1 to 400_n fetches or places the item in the detection area 500, the camera 100 may capture the image that the handle of the person reaches into the upper part of the detection area 500 from a vertical view angle, and the camera 200_1 and the camera 200_2 may capture the images of the persons 400_1 to 400_n at different view angles at corresponding moments.

In the embodiments of the present disclosure, the image collection device 100 generally is provided above the detection area 500, such as being directly above or in the vicinity directly above the central point of the detection area, and the collection range at least covers the whole detection area; the image collection devices 200_1 and 200_2 are located at the sides of the detection area, are respectively provided at two opposite sides of the detection area, and have the setting heights that are flush with the target object in the detection area, and the collection range covers the whole detection area and the intervention objects around the detection area.

In some embodiments, if the detection area is a square area on a desktop, the image collection device 100 may be provided directly above the central point of the square area, the setting height thereof may be adjusted according to the view angle of the specific image collection device, and it is guaranteed that the collection range may cover the square area of the whole detection area; the image collection devices 200_1 and 200_2 are respectively provided at two opposite sides of the detection area, the setting heights thereof are flush with the target objects 300_1 to 300_n of the detection area, the distance between the image collection device and the detection area may be adjusted according to the view angle of the specific image collection device, and it is guaranteed that the collection range may cover the whole detection area and the intervention objects around the detection area.

It should be noted that in actual use, apart from the image collection devices 200_1 and 200_2, more image collection devices located at the side of the detection area may also be set according to requirements. The embodiments of the present disclosure do not define this.

Figure 2:
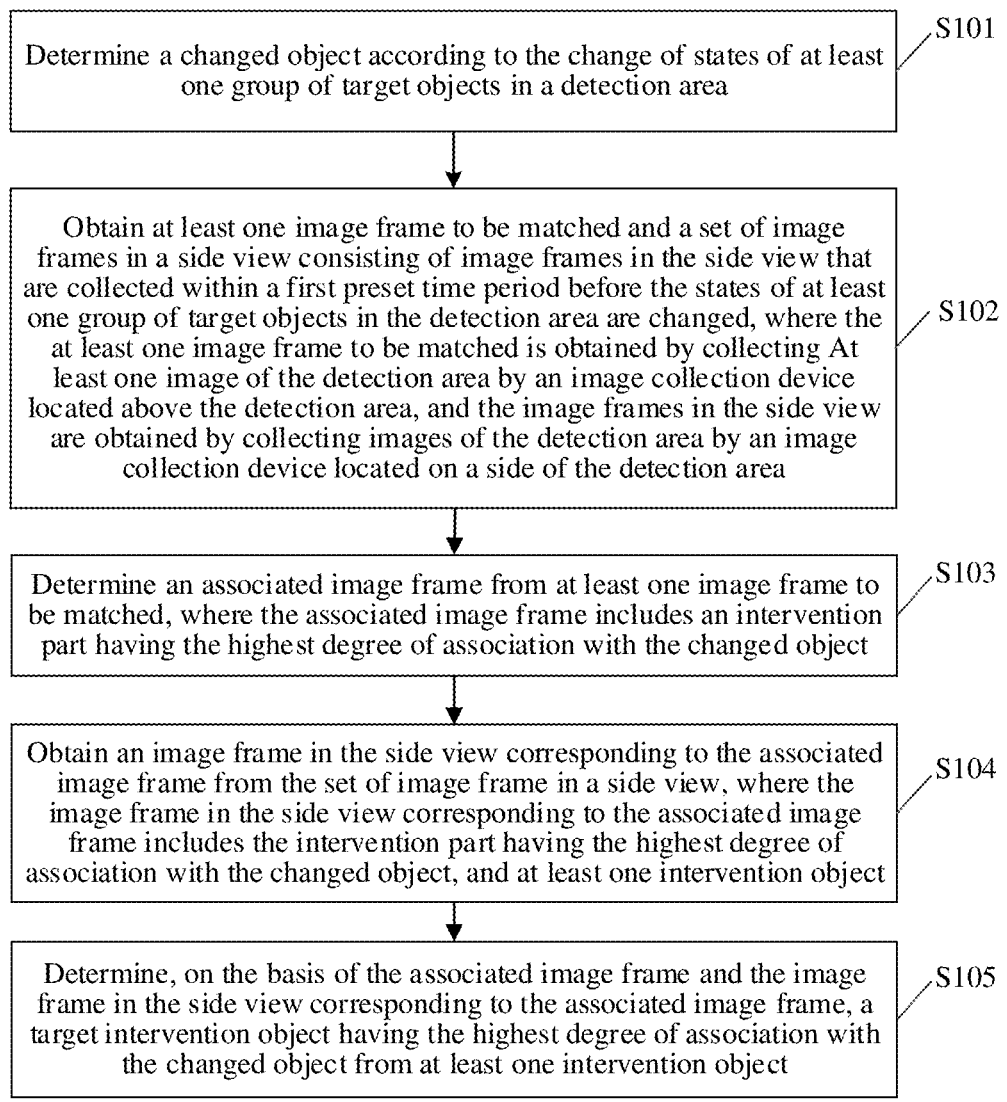
FIG. 2 is an optional flow chart I of the image recognition method provided by the embodiments of the present disclosure.

FIG. 2 is an optional flow chart of the image recognition method provided by the embodiments of the present disclosure, and description is made with reference to the operation shown in FIG. 2.

At S101, the changed object is determined according to the change of states of the at least one group of target objects in the detection area.

The image recognition method provided by the embodiments of the present disclosure is suitable for recognizing the target object or person that makes a monitored object change in multiple objects or persons. Illustratively, the image recognition method provided by the embodiments of the present disclosure is suitable for the scenes, such as automatic bookkeeping and retail systems, and intelligent item monitoring.

In the embodiments of the present disclosure, each group of target objects in the at least one group of target objects may be formed by stacking at least one sub object.

In some embodiments of the present disclosure, at least one group of target objects may be stacked some piles of books; each pile of books is a group of target objects and may also be stacked coins; and each pile of coins are a group of target objects.

In the embodiments of the present disclosure, the image collection device may be provided above the detection area, and is configured to monitor the sub object included in the at least one group of target objects, and determining that the states of the at least one group of target objects are changed when the sub object included in the at least one group of target objects is changed, or it is monitored that a new group of target object occur in the detection area, or any one group of previous target objects disappear in the detection area.

In the embodiments of the present disclosure, the image collection device may also be provided at an angle parallel to the side of the detection area, and is configured to continuously monitor the sub object included in the at least one group of target objects, and determining that the states of the at least one group of target objects are changed when it is monitored that the number or the appearance of the sub objects included in any one group of target objects is changed.

It should be noted that in the embodiments of the present disclosure, the problem that the target objects shelter each other exists when it is monitored is performed from the side view angle, and therefore, in order to ensure the accuracy of monitoring, at least two image collection devices may be provided at the sides of the detection area and monitor the number or the appearance of the at least one existing group of target objects in the detection area.

In the embodiments of the present disclosure, all detection areas may be placed in the detection frame of the image collection device; if the number of at least one group of target objects is not changed in the detection frame, the image statistical characteristics of the detection area may be represented as a smoothing curve on continuous collection time points; if the number of at least one group of target objects is changed in the detection frame, for example, the total number of groups increases or decreases, the curve corresponding to the image characteristic of the at least one group of target objects is changed abruptly, and it is indicated that the image content of the at least one group of target objects is changed, and thus, it is known whether the at least one group of target objects in the detection area are changed by monitoring the image characteristic curve of the at least one group of target objects.

In the embodiments of the present disclosure, in order to ensure the accuracy of detection, it can be determined that the states of the at least one group of target objects are changed after the number of at least one group of target objects that are changed stably exceeds the preset number of frames.

In some embodiments, after it is detected that the number of newly added at least one group of target objects stably exceeds 5 frames, or the number of reduced at least one group of target objects stably exceeds 20 frames, it is determined that the number of at least one group of target objects is changed.

In some embodiments, three piles of stacked books are taken as at least one group of target objects, where each pile of books corresponds to a group of target objects; one pile of books include 20 books; a side view camera is taken as the image collection device located at the angle parallel to the side of the detection area, and separately performs continuous image collection on the detection area from the left and right side angles; if 5 books are taken away from the pile of books including 20 books, the side view camera monitors that the number of books in one pile of books including 20 books among three piles of stacked books decreases; and if the reduced 5 books disappear more than 20 frames from the detection area, it is determined that the number of at least one sub object in the at least one group of target objects is changed.

In the embodiments of the present invention, the at least one sub object having the change of states in the at least one group of target objects is determined as the changed object.

In some embodiments, a camera with aerial view is the image collection device located above the detection area; if the camera with aerial view detects that a group of target objects are added in a new position of the detection area, a group of target objects is added and taken as the changed objects; and if the camera with aerial view detects that one group of previous target objects in the detection area disappear, the disappeared target objects are taken as the changed objects.

In some embodiments, the side view camera is the image collection device located at the side of the detection area; if the side view camera detects that the number of sub objects in one existing group of target objects increases by 20, the increased 20 sub objects are taken as the changed objects; and if the side view camera detects that the number of sub objects in one existing group of target objects decreases by 20, the decreased 20 sub objects are taken as the changed objects.

At S102, the set of image frame in the side view consisting of the image frames in the side view and the at least one image frame to be matched that are collected within the first preset time period before the states of the at least one group of target objects in the detection area are changed are obtained, where the at least one image frame to be matched is obtained by collecting at least one image of the detection area by an image collection device located above the detection area, and the image frames in the side view are obtained by collecting images of the detection area by an image collection device located on a side of the detection area.

In the embodiments of the present disclosure, if the states of the at least one group of target objects in the detection area are changed, the set of image frame in the side view and the at least one image frame to be matched that are collected within the first preset time period before the states of the at least one group of target objects are changed are obtained by means of the image collection device.

In the embodiments of the present disclosure, the image collection device is configured to perform continuous image collection on the detection area and the intervention objects around the detection. The image collection device in the embodiments of the present disclosure may also be a moving camera, may also be a still camera, or is other devices having the image collection function. The embodiments of the present disclosure do not define this.

In the embodiments of the present disclosure, the image collection device is provided above the detection area and configured to continuously monitor the image of the at least one group of target objects from the bird's eye view; and the image collection device is provided at the side of the detection area and configured to continuously monitor the image of the at least one group of target objects from the side view angle. If the states of the at least one group of target objects are changed, the image frames that are collected within the first preset time period before a state change time point are obtained by means of the image collection device located above the detection area and taken as at least one image frame to be matched; meanwhile, the image frame that is synchronously collected with the at least one image frame to be matched is obtained by means of the image collection device located at the side of the detection area and taken as the set of image frame in the side view.

In some embodiments, the camera with aerial view provided above the detection area is taken as the image collection device; the side view camera provided at the side of the detection area is taken as the image collection device; the number of at least one group of target objects is changed at time point B, and the first preset time period is 2 seconds; the image frame that is collected by the camera with aerial view from B-2 time point to B time point is obtained and taken as the at least one image frame to be matched; and the image frame that is collected by the side view camera from B-2 time point to B time point is obtained and taken as the set of image frame in the side view.

It can be understood that in the embodiments of the present disclosure, if the number of at least one group of target objects in the detection area is changed, the images of at least one group of target objects that are intervened to change can be captured from the bird's eye view, and thus, the problem that the target objects shelter each other from the side view angle is avoided; meanwhile, the whole side image of at least one intervention object near the target object can be captured from the side view angle, and thus, the problem of failing to capture the whole image of the intervention object from the bird's eye view is avoided.

At S103, the associated image frame is determined from the at least one image frame to be matched, where the associated image frame includes the intervention part having the highest degree of association with the changed object.

In the embodiments of the present disclosure, after the changed object is determined, the associated image frame having the highest degree of association with the changed object is determined from the at least one image frame to be matched.

Figure 3:
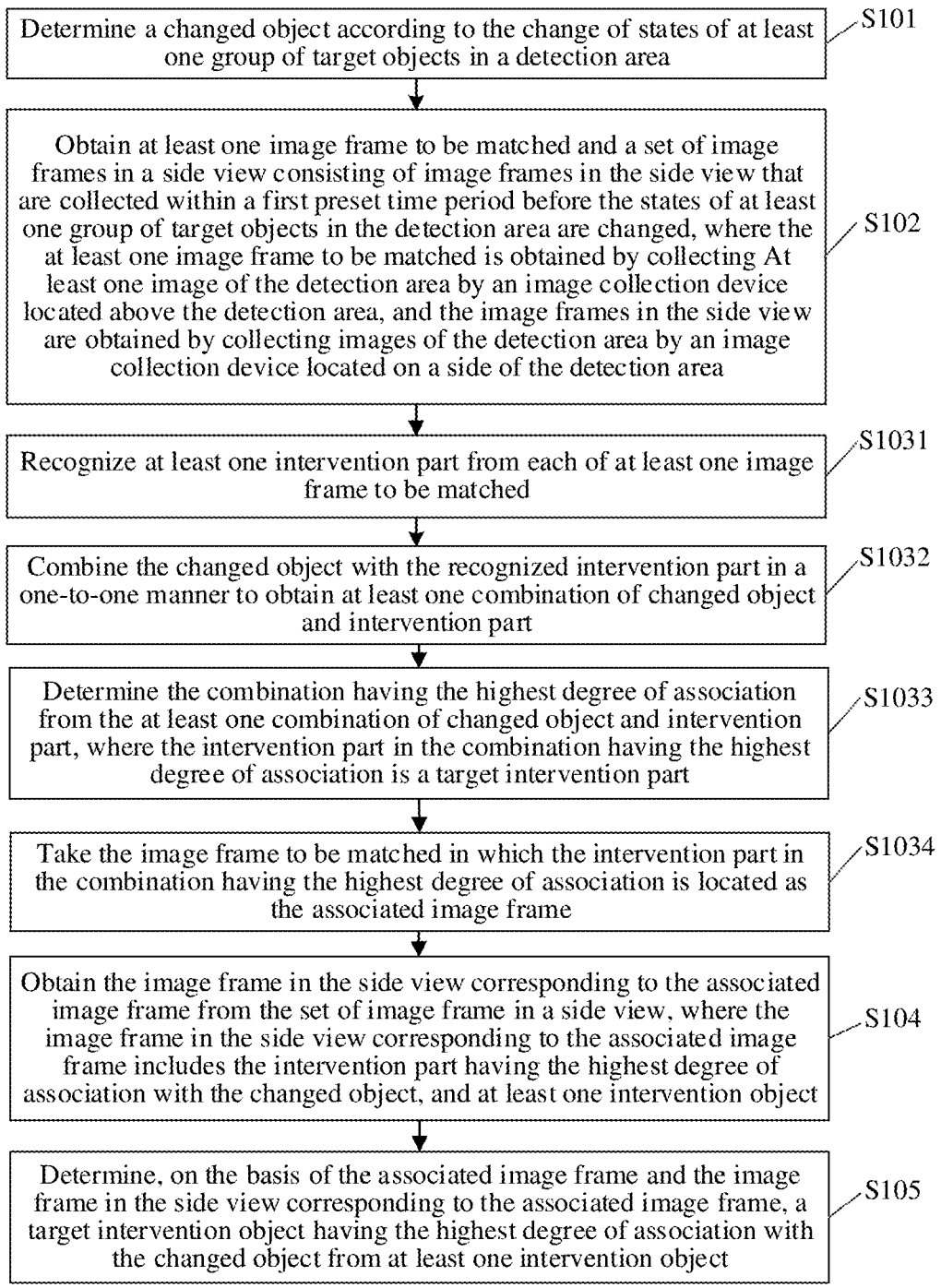
FIG. 3 is an optional flow chart II of the image recognition method provided by the embodiments of the present disclosure.

In the embodiments of the present disclosure, based on FIG. 2, determining the associated image frame having the highest degree of association with the changed object from the at least one image frame to be matched may be as shown in FIG. 3, including the following operations S1031-S1034.

At S1031, at least one intervention part is recognized from each of at least one image frame to be matched, where the at least one intervention part is a part of the at least one intervention object which appears in at least one image frame to be matched.

In the embodiments of the present disclosure, after the at least one image frame to be matched is obtained, the recognition of the intervention part is performed on each image frame to be matched, and the intervention part in each image frame to be matched is recognized, and thus, at least one intervention part is obtained.

In the embodiments of the present disclosure, an image recognition algorithm may be configured to recognize at least one intervention part from each image frame to be matched, and other methods may also be used. The embodiments of the present disclosure do not define this.

In the embodiments of the present disclosure, one intervention part is a part where the state of the target object is changed because one intervention object intervenes the target object, and is a part that appears in the at least one image frame to be matched.

In the embodiments of the present disclosure, when a part of the intervention objects enter the detection area of the image collection device, whether the intervention objects contact the changed object or not, a part of images of the intervention objects can be captured in the image frame to be matched, and the part of the captured image of at least one intervention object is taken as at least one intervention part.

In some embodiments, the camera with aerial view serves as the image collection device located above the detection area. When the intervention object is a person, the image that a human hand stretches into the detection area can be captured by means of the camera with aerial view, and at least one human hand image that is captured in the image frame to be matched is taken as at least one intervention part.

At S1032, the changed object is combined with the recognized intervention part in the one-to-one manner to obtain at least one combination of changed object and intervention part.

In the embodiments of the present disclosure, after at least one intervention part is recognized, the changed object is combined with the recognized intervention part in the one-to-one manner to obtain at least one combination of changed object and intervention part.

It should be noted that in the embodiments of the present disclosure, because it is needed to recognize the intervention part included in the image frame to be matched from each image frame to be matched, at least one intervention part may include several repeated intervention parts, and when the changed object is combined with at least one intervention part in the one-to-one manner, it is needed to guarantee that the changed object is combined with each intervention part only once.

At S1033, the combination having the highest degree of association is determined from at least one combination of changed object and intervention part, where the intervention part in the combination having the highest degree of association is the target intervention part, that is to say, the target intervention part is the intervention part having the highest degree of association with the changed object in the intervention parts.

In the embodiments of the present disclosure, the determining the combination having the highest degree of association from the combination of at least one group of changed objects and an intervention object part can be realized by means of the following operations S201 to S202.

At S201, the distances between the changed objects and the intervention parts in each of the at least one combination of changed object and intervention part are obtained.

In the embodiments of the present disclosure, the distances between the changed objects and the intervention parts in each of the at least one combination of changed object and intervention part can be obtained by means of the image collection device located above the detection area.

In the embodiments of the present disclosure, in the side view angle, the distance between the intervention part and the changed object is not proportional to an actual distance, and therefore, the actual distance cannot be calculated according to the distance between the intervention part and the changed object obtained from the side view angle. The distances between the changed objects and the intervention parts in the combination of each changed object and the intervention part is obtained from the bird's eye view by means of the image collection device located above the detection area to obtain the distance between at least one changed object and the intervention part.

At S202, a minimum distance is determined from the distance.

In the embodiments of the present disclosure, a minimum value is found from the distance between at least one changed object and the intervention part, and taken as the minimum distance.

In some embodiments of the present disclosure, the method for determining the minimum distance from the distance between at least one changed object and the intervention part further can include the following operations S2021 to S2022.

At S2021, inverse ratio calculation is performed on the distance to obtain the calculation result of each distance in the distance between at least one changed object and the intervention part.

In the embodiments of the present disclosure, any formula that is negatively correlated with the distance can be used for calculation in the method for performing inverse ratio calculation on the distance to obtain a corresponding calculation result.

In the embodiments of the present disclosure, functions that are negatively correlated with the distance all can be used for calculation, and the embodiments of the present disclosure do not define this.

In some embodiments, the distances between the changed objects and the intervention parts in each combination is d, and the calculation result of a distance inverse ratio calculation can be obtained by calculating $$\frac{1}{d}$$

or $e^{-d}$.

In the embodiments of the present disclosure, the method for performing inverse ratio calculation on the distance may also be other method, and the embodiments of the present disclosure do not define this.

At S2022, a maximum calculation result is determined from the calculation result, and the distance corresponding to the maximum calculation result is determined as the minimum distance.

In the embodiments of the present disclosure, after the result of the distance inverse ratio calculation is obtained, the maximum calculation result is determined from the calculation result, and the distance corresponding to the maximum calculation result is determined as the minimum distance.

It can be understood that the intervention part corresponding to the maximum calculation result of the distance inverse ratio calculation is the intervention part closest to the changed object.

At S203, the combination of the changed object and the intervention part corresponding to the minimum distance is taken as the combination having the highest degree of association.

In the embodiments of the present disclosure, the intervention part corresponding to the minimum distance is the intervention part closest to the changed object in at least one intervention part, and the probability that the intervention part is associated with the changed object is maximum. Therefore, the combination of the changed object and the intervention part corresponding to the minimum distance is taken as the combination having the highest degree of association.

In some embodiments, when one pile of books are added to the stacked books in the detection area, at least one group of image frames to be matched are obtained by means of the camera with aerial view, and at least one human hand image of entering the detection is captured in at least one group of image frames to be matched. The added books are combined with at least one human hand image in a one-to-one manner. The distances between the added books and the human hand image are calculated, and the combination of the added book corresponding to the minimum distance and the human hand image taken as the combination having the highest degree of association.

It can be understood that in the embodiments of the present disclosure, the intervention part in the combination having the highest degree of association is the intervention part that is most likely to contact the changed object. Because the distance obtained from the bird's eye view is proportional to the actual distance, the present disclosure solves the problem that the distance between the intervention part and the changed object obtained from the side view angle is disproportionate, and the problem that it is not accurate to associated the intervention part and the changed object from the side view angle, thereby improving the accuracy of associating the changed object and the intervention part, and further improving the accuracy of associating the changed object and the target intervention object.

In some embodiments of the present disclosure, the determining the combination having the highest degree of association from at least one combination of changed object and intervention part further can include the following operations S301 to S302.

At S301, an actual motion trajectory of each of the recognized intervention parts is obtained.

In the embodiments of the present disclosure, the obtaining the actual motion trajectory of each of the recognized intervention parts can include the following operations S3011 to S3014.

At S3011, the trigger time point when the state of the target object is changed is obtained.

In the embodiments of the present disclosure, the time point when the state of the target object is changed is recorded and obtained as the trigger time point.

At S3012, at least one motion trajectory image frame that is collected within a second preset time period before the trigger time point is obtained, and the at least one motion trajectory image frame is obtained by the image collection device located above the detection area.

In the embodiments of the present disclosure, after the trigger time point, at least one image frame that is collected within the second preset time period before the trigger time point is obtained and taken as at least one motion trajectory image frame.

In some embodiments, the intervention part is the human hand image; the second preset time period is 5 seconds; 10 image frames collected by the camera with aerial view within 5 seconds are obtained; each image frame includes at least one human hand image located at different positions; and the 10 image frames are taken as at least one motion trajectory image frame.

It should be noted that in the embodiments of the present invention, in order to make the motion trajectory of the intervention part be more accurate, the second preset time period is generally set to be the time period longer than the first preset time period. Therefore, at least one motion trajectory image frame that is collected within the second preset time period before the trigger time point generally includes at least one image frame to be matched that is collected within the first preset time period.

At S3013, the corresponding position information of each recognized intervention part in at least one motion trajectory image frame is obtained.

In the embodiments of the present disclosure, at least one motion trajectory image frame includes the images of each intervention part at different positions, and for the same intervention part, the respective corresponding position information of the intervention part in each motion trajectory image frame is obtained from at least one motion trajectory image frame.

In the embodiments of the present disclosure, for each intervention part, the respective corresponding position information of each intervention part in each motion trajectory image frame is determined.

In some embodiments, when the intervention part is the human hand image, the position of the human hand image in each image frame of 10 frames of motion trajectory image frames is obtained and taken as the position information corresponding to the image of the human hand.

At S3014, according to a time sequence of at least one motion trajectory image frame, vectorization connection is performed on the position information to obtain the actual motion trajectory of each recognized intervention part.

In the embodiments of the present disclosure, for the same intervention part, after the position information corresponding to the intervention part is determined, the position information corresponding to the intervention part is sequentially connected to be a line in the sequence from the starting point to the ending point of the time sequence according to a time sequence of at least one motion trajectory image frame, so that a vector trajectory corresponding to the intervention part is obtained and taken as the actual motion trajectory of the intervention part.

In the embodiments of the present disclosure, for each recognized intervention part, the actual motion trajectory of each recognized intervention part is determined.

In some embodiments, after the position information corresponding to one human hand image is obtained, according to different collection time of 10 frames of motion trajectory image frames, connection is sequentially performed starting from the position corresponding to the human hand image in a first motion trajectory image frame to the position corresponding to the human hand image in next motion trajectory image frame, and finally the actual motion trajectory corresponding to the human hand image is obtained.

At S302, in at least one combination of changed object and intervention part, a simulated motion trajectory from the intervention part to the changed object in each combination is obtained, where the simulated motion trajectory from the intervention part to the changed object in one combination is a trajectory connecting the intervention part and the changed object in the combination.

In the embodiments of the present disclosure, for the combination of one changed object and the intervention part, the intervention part in the combination is connected to the changed object, and the obtained vector trajectory is taken as the simulated motion trajectory from the intervention part to the changed object in the combination.

At S303, similarity between each actual motion trajectory and each simulated motion trajectory is compared.

In the embodiments of the present disclosure, for the combination of one changed object and the intervention part, the similarity between the actual motion trajectory of the intervention part included in the combination and the simulated motion trajectory corresponding to the combination is compared.

In the embodiments of the present disclosure, the method for comparing the similarity between two vector trajectories is the prior art, and the embodiments of the present disclosure do not describe it again.

At S304, the combination of the changed object and the intervention part corresponding to the simulated motion trajectory having the highest similarity with the actual motion trajectory is determined to be the combination having the highest degree of association In the embodiments of the present disclosure, the actual motion trajectory having the highest similarity with the simulated motion trajectory is most likely to be the motion trajectory moving towards the changed object and contacting the changed object. Therefore, the combination of the changed object and the intervention part corresponding to the simulated motion trajectory having the highest similarity with one actual motion trajectory is determined to be the combination having the highest degree of association.

It should be noted that operations S201 to S203 and S301 to S303 relate to two optional methods for determining the combination having the highest degree of association from at least one combination of changed object and intervention part, and one or two methods can be selected according to an actual situation when the methods are specifically applied. The embodiments of the present disclosure do not define this.

At S1034, the image frame to be matched in which the intervention part in the combination having the highest degree of association located is taken as the associated image frame. That is to say, the associated image frame includes the intervention part having the highest degree of association with the changed object, i.e., including the target intervention part.

In the embodiments of the present disclosure, after the combination having the highest degree of association, the image frame to be matched in which the intervention part in the combination having the highest degree of association is located is taken as the associated image frame. That is to say, the associated image frame includes the information of the intervention part having the highest degree of association with the changed object.

After operation S103, as shown in FIG. 2 and FIG. 3, the image recognition method provided by the embodiments of the present disclosure further includes the following operations.

At S104, the image frame in the side view corresponding to the associated image frame is obtained from the set of image frame in the side view, where the image frame in the side view corresponding to the associated image frame includes the intervention part having the highest degree of association with the changed object, and at least one intervention object.

In the embodiments of the present disclosure, after the associated image is obtained, the image frame in the side view corresponding to the associated image frame that is synchronously collected with the associated image frame is obtained from the set of image frame in the side view.

In the embodiments of the present disclosure, the image collection device located above the detection area and the image collection device located on the side of the detection area synchronously perform collection on the detection area. Therefore, at the time point when the image collection device located above the detection area collects the associated image, the image collection device located on the side of the detection area can also synchronously collect the image frame in the side view corresponding to the associated image frame of the same scene.

In the embodiments of the present disclosure, the whole side image of at least one intervention object associated with the changed object can be captured from the image frame in the side view corresponding to the associated image frame.

In some embodiments, when detection is performed on the actions that one person takes and puts the book of the detection area, it is determined, by means of the camera with aerial view, that the number of books is varied, then the human hand image having the highest degree of association with the changed object in the detection area is entered, and the image frame in which the human hand image is located is taken as the associated image frame. The image frame in the side view corresponding to the associated image frame that is synchronously collected with the associated image frame is obtained in the side view camera, where the image frame in the side view corresponding to the associated image frame includes the side image of at least one person, including the side face image of at least one person, the image of side body of at least one person, and the side human hand image of at least one person. In the side image of at least one person, the side face image, the image of side body, and the side human hand image of each person are associated with each other.

It can be understood that in the embodiments of the present disclosure, an intervention part image included in the associated image frame is the image collected from the bird's eye view, because it is very difficult to collect the key identification information, such as human face information, of the intervention object from the bird's eye view, it is impossible to directly associate the changed object with the identification information of the intervention object only according to the intervention part image from the bird's eye view. Therefore, it is needed to obtain a synchronous side image frame configured to associate the intervention part image from the bird's eye view with the whole side image of the intervention object.

At S105, the target intervention object having the highest degree of association with the changed object is determined from at least one intervention object on the basis of the associated image frame and the image frame in the side view corresponding to the associated image frame.

In the embodiments of the present disclosure, after the image recognition device obtains the image frame in the side view corresponding to the associated image frame, the image recognition device performs image fusion on the associated image frame and the image frame in the side view corresponding to the associated image frame to fuse the image information of the intervention part and the intervention object synchronously obtained from different angles together, thereby determining the target intervention object having the highest degree of association with the changed object from at least one intervention object, and completing the image recognition process of associating the changed object to the target intervention object.

Figure 4:
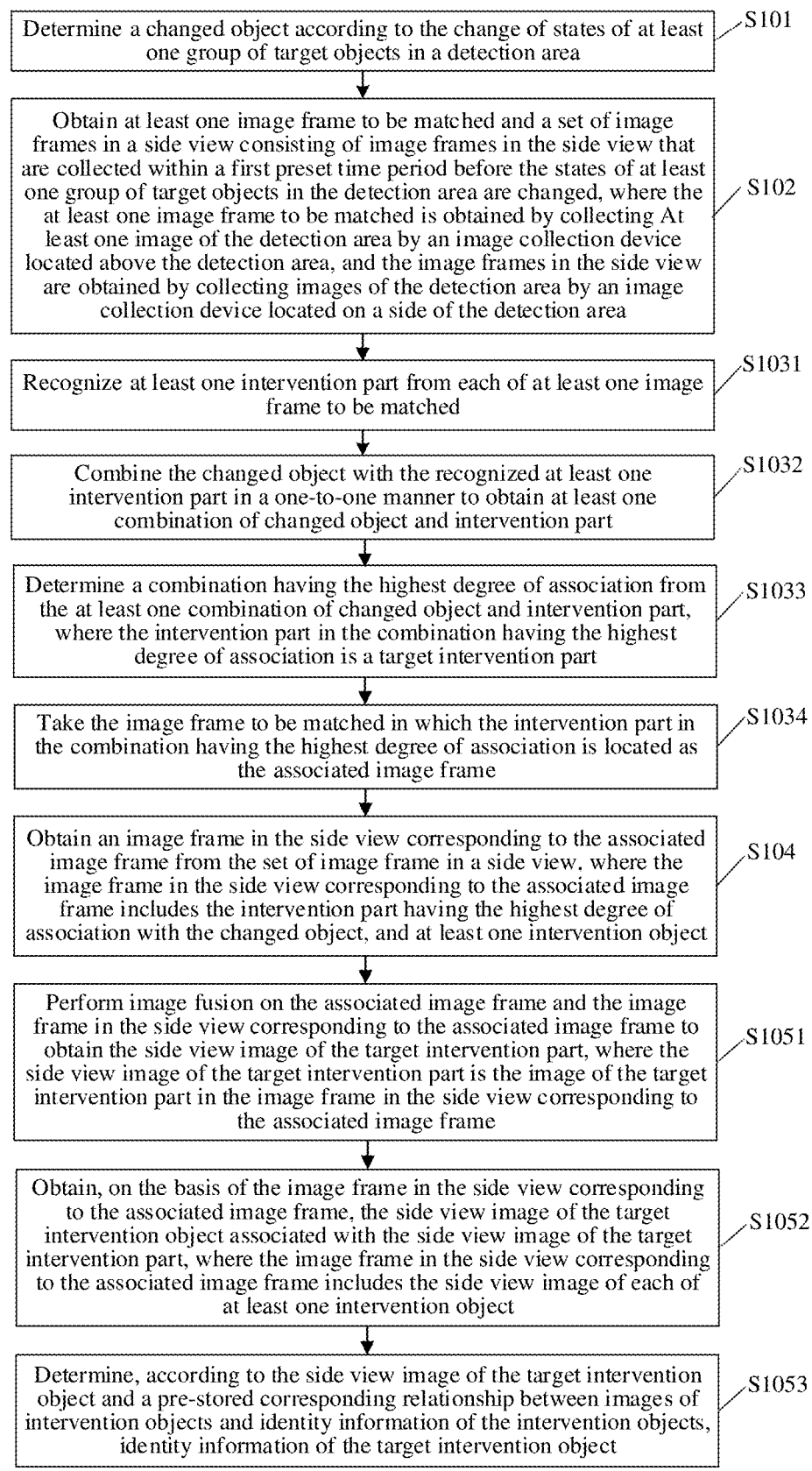
FIG. 4 is an optional flow chart III of the image recognition method provided by the embodiments of the present disclosure.

In the embodiments of the present disclosure, based on FIG. 3, according to the associated image frame and the image frame in the side view corresponding to the associated image frame, the determining the target intervention object having the highest degree of association with the changed object from at least one intervention object may be as shown in FIG. 4, and includes the following operations S1051 to S1053.

At S1051, image fusion is performed on the associated image frame and the image frame in the side view corresponding to the associated image frame to obtain a side view image of the target intervention part, and the side view image of the target intervention part is the image of the target intervention part in the image frame in the side view corresponding to the associated image frame.

In the embodiments of the present disclosure, because the associated image frame and the image frame in the side view corresponding to the associated image frame are the image frames obtained by performing synchronous collection on the detection area from different angles, the image information of the same object obtained from the bird's eye view and the side view angle are associated with each other, so that the image at the side view angle corresponding to the target intervention part at the bird's eye view in the image frame in the side view corresponding to the associated image frame is obtained and taken as the side image of the target intervention part.

In the embodiments of the present disclosure, the intervention part is the human hand image; the intervention object is the person; the target intervention part included in the associated image frame at the bird's eye view is the human hand image A1; and a side view person image frame includes a side human hand image A1', a side human hand image B1', and a side human hand image C1'. After image fusion is performed on the associated image frame and the image frame in the side view corresponding to the associated image frame, and image fusion is performed on human hand image information obtained from the bird's eye view and the human hand image information obtained from the side view angle, the information that the side human hand image A1' and the human hand image A1 obtained from the bird's eye view are the same human hand can be obtained, and the side human hand image A1' is taken as the side image of the target intervention part.

At S1052, the side view image of the target intervention object associated with the side view image of the target intervention part is obtained on the basis of the image frame in the side view corresponding to the associated image frame, where the image frame in the side view corresponding to the associated image frame includes the side view image of at least one intervention object.

In the embodiments of the present disclosure, the image frame in the side view corresponding to the associated image frame includes the whole side image of at least one intervention object, and the side view image of the target intervention part is a part of the side image of one intervention object, that is to say, the side view image of the target intervention part is a part of the side view image of the corresponding intervention object, and is associated with other parts of the side view image of the intervention object. On the basis of the image frame in the side view corresponding to the associated image frame, the side view image of the intervention object associated with the side view image of the target intervention part is taken as the side view image of the target intervention object.

In some embodiments, the side view image of the target intervention part is the side human hand image A1', and the image frame in the side view corresponding to the associated image frame includes a side image of person A', a side image of person B', and a side image of person C'. The side image of person A' further includes an image of side body A2' and a image of side face A3'. Because in the image frame in the side view corresponding to the associated image frame, the human hand image A1' at the side view angle and the image of side body A2' are connected with each other, A1' can be associated to A2'; the image of side body A2' is also connected with the image of side face A3', and then the human hand image A1' at the side view angle is further associated to the image of side face A3', and the image of side face A3' is taken as the side view image of the target intervention object.

It can be understood that after multi-angle image fusion is performed on the associated image frame in which the target intervention part is located and the image frame in the side view corresponding to the associated image frame, an association relationship between the target intervention part at the bird's eye view and the side view image of the target intervention object at the side view angle is obtained, and thus identity recognition can be further performed on the target intervention object according to the information included in the side view image of the target intervention object, so that the problem that the identification information of the intervention object cannot be collected at the bird's eye view, and the problem that the intervention part image at the bird's eye view cannot be directly associated with the identification information of the intervention object are solved.

At S1053, according to the side view image of the target intervention object and a pre-stored corresponding relationship between images of intervention objects and identity information of the intervention objects, the identity information of the target intervention object is determined.

In the embodiments of the present disclosure, for one intervention object, the corresponding relationship between images of intervention objects and identity information of the intervention objects is pre-stored, and the identity information of the intervention object can be uniquely corresponded by means of the image of the intervention object.

In some embodiments, the pre-stored corresponding relationship between images of intervention objects and identity information of the intervention objects may be the corresponding relationship between the image of frontal face of each person and the ID of the person; illustratively, the image of frontal face A corresponds to the person A, the image of frontal face B corresponds to the person C, and the image of frontal face C corresponds to the person C. According to the side view image of the target intervention object, i.e., the human face image A3' at the side view angle, the corresponding image of frontal face A corresponding to A3' is matched; then the human face image A3' at the side view angle is further associated to the person A corresponding to the image of frontal face A by means of the pre-stored corresponding relationship between the image of frontal face of each person and the ID of the person, and the person A is taken as the target intervention object.

It can be understood that in the embodiments of the present disclosure, the information of the target intervention part having higher accuracy and associated with the changed object can be obtained from the bird's eye view, and by means of image fusion, the information of the target intervention part at the bird's eye view is combined with the complete information of the intervention object at the side view angle, so that the present disclosure realizes the association from the information of the target intervention part at the bird's eye view to the information of the target intervention object at the side view angle, further associating the information of the target intervention object with the pre-stored identification information of the intervention object, and improving the accuracy of recognizing the target intervention object.

In the embodiments of the present disclosure, after S105, the following operations S106 to S107 are further included.

At S106, a side image of the changed object is obtained from the image frame in the side view corresponding to the associated image frame.

At S107, an object value of the changed object is obtained according to the side image of the changed object, where the object value is the sum of values of at least one sub changed object constituting the changed object, the side image of the changed object includes a side image of each of at least one sub changed object, and the side image of each of at least one sub changed object represents different values.

In the embodiments of the present disclosure, at least one target object is formed by stacking at least sub object and the changed object is a part of at least one group of target objects, and therefore, the image of the changed object at the side view angle can be obtained by means of the image collection device at the side of the detection area, and according to the images of the changed object at different side view angles, the object value of the changed object is obtained.

In the embodiments of the present disclosure, the changed object includes at least one sub changed object, where the image of the sub changed object at the side view angle may include different colors, figures, or recognizable patterns or characters; different colors, figures, or recognizable patterns or characters may represent different value information.

In the embodiments of the present disclosure, the object value of the changed object is the sum of the values represented by the image of each sub changed object at the side view angle constituting the changed object.

At S108, the target intervention object is associated with the object value, so that the information of a corresponding object value that is obtained or payed by the target intervention object is obtained.

In some embodiments, the value of each red book is RMB 10 yuan and the value of each green book is RMB 20 yuan; by means of the camera at the side view angle, it is detected that the height of a certain pile of stacked books is reduced and the number of books is reduced; by means of the side view camera, the side image of a reduced book is obtained; by means of the side colors of the books, it is found that 10 red books and 5 green books are reduced, and it can be obtained that the object value of the reduced books is RMB 200 yuan; according to S101 to S105, it is obtained that the target intervention object is the person A; and the target intervention object is associated with the object value, so that the information that the person A takes away the books having the value of RMB 200 yuan.

It can be understood that the object values of at least one group of changed objects are obtained by means of the camera at the side view angle and are associated with a target person; and the specific information that the target person operates at least one group of changed objects is further complemented.

Figure 5:
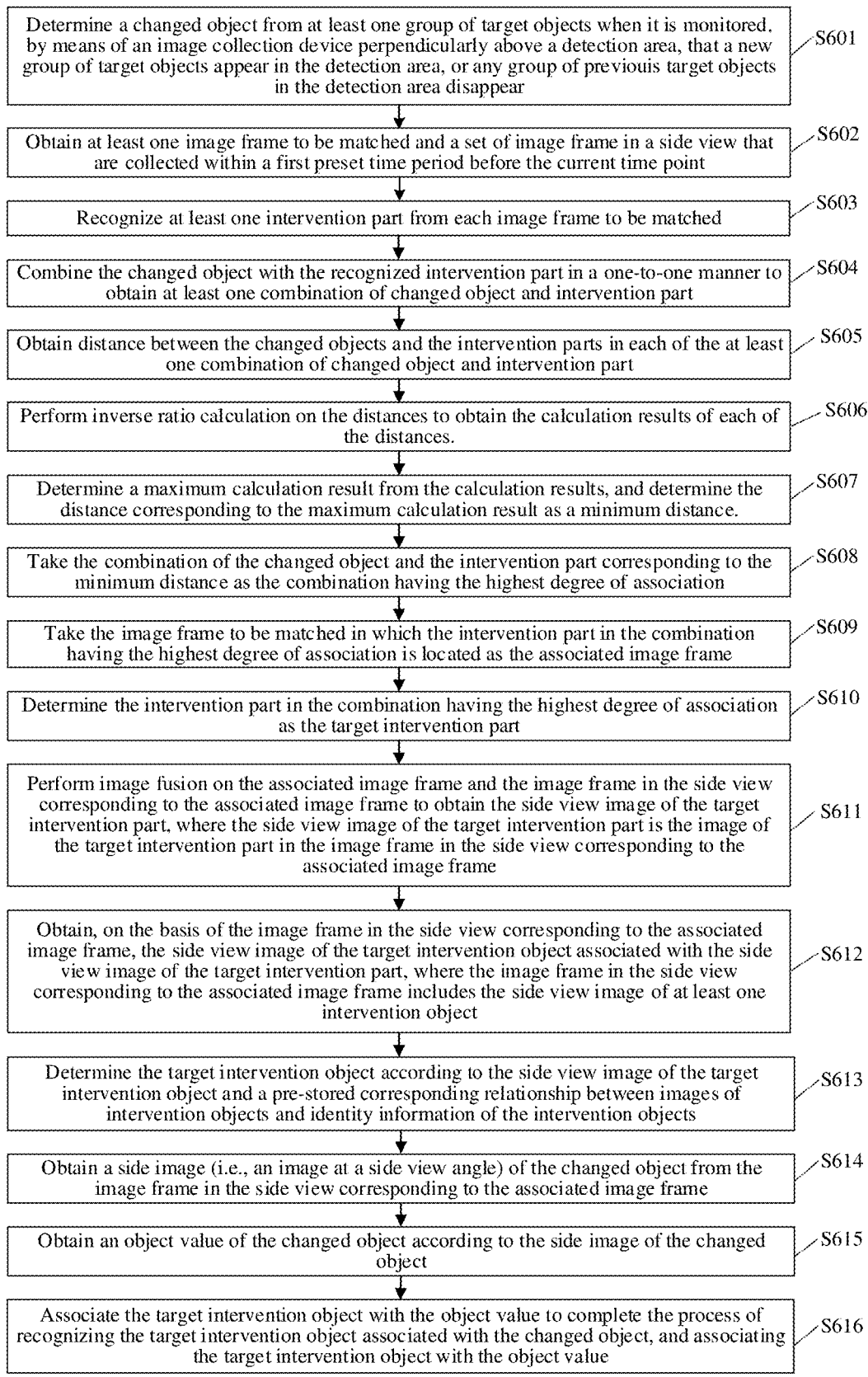
FIG. 5 is an optional flow chart IV of the image recognition method provided by the embodiments of the present disclosure.

In some embodiments of the present disclosure, an implementation method of recognizing the target intervention object associated with the changed object, and associating the target intervention object with the object value may be as shown in FIG. 5, and includes the following operations S601 to S616.

At S601, when it is monitored by means of the image collection device that a new group of target objects appear in the detection area, or previous any of the detection area disappear, the changed object is determined from at least one group of target objects.

At S602, at least one image frame to be matched that is collected within the first preset time period before the current time point and the set of image frame in the side view are obtained.

At S603, at least one intervention part is recognized from each image frame to be matched.

At S604, the changed object is combined with the recognized intervention part in the one-to-one manner to obtain at least one combination of changed object and intervention part.

At S605, the distances between the changed objects and the intervention parts in each of the at least one combination of changed object and intervention part are obtained.

At S606, inverse ratio calculation is performed on the distance to obtain the calculation results of each of the distances.

At S607, the maximum calculation result is determined from the calculation result, and the distance corresponding to the maximum calculation result is determined as the minimum distance.

At S608, the combination of the changed object and the intervention part corresponding to the minimum distance is taken as the combination having the highest degree of association.

At S609, the image frame to be matched in which the intervention part in the combination having the highest degree of association is located is taken as the associated image frame.

At S610, the intervention part in the combination having the highest degree of association is determined as the target intervention part.

At S611, image fusion is performed on the associated image frame and the image frame in the side view corresponding to the associated image frame to obtain a side view image of the target intervention part, and the side view image of the target intervention part is the image of the target intervention part in the image frame in the side view corresponding to the associated image frame.

At S612, the side view image of the target intervention object associated with the side view image of the target intervention part is obtained on the basis of the image frame in the side view corresponding to the associated image frame, where the image frame in the side view corresponding to the associated image frame includes the side view image of at least one intervention object.

At S613, according to the side view image of the target intervention object and a pre-stored corresponding relationship between images of intervention objects and identity information of the intervention objects, the target intervention object is determined.

At S614, the side image (i.e., the image at the side view angle) of the changed object is obtained from the image frame in the side view corresponding to the associated image frame.

At S615, the object value of the changed object is obtained according to the side image of the changed object.

At S616, the target intervention object is associated with the object value to complete the process of recognizing the target intervention object associated with the changed object, and associating the target intervention object with the object value.

It should be noted that the image recognition method provided by the embodiments of the present disclosure relates to continuously monitoring at least one target object in the detection area after recognizing the target intervention object associated with the changed object, and when the amount of at least one target object is changed again, continuously recognizing the target intervention object in the same processing method.

Figure 6:
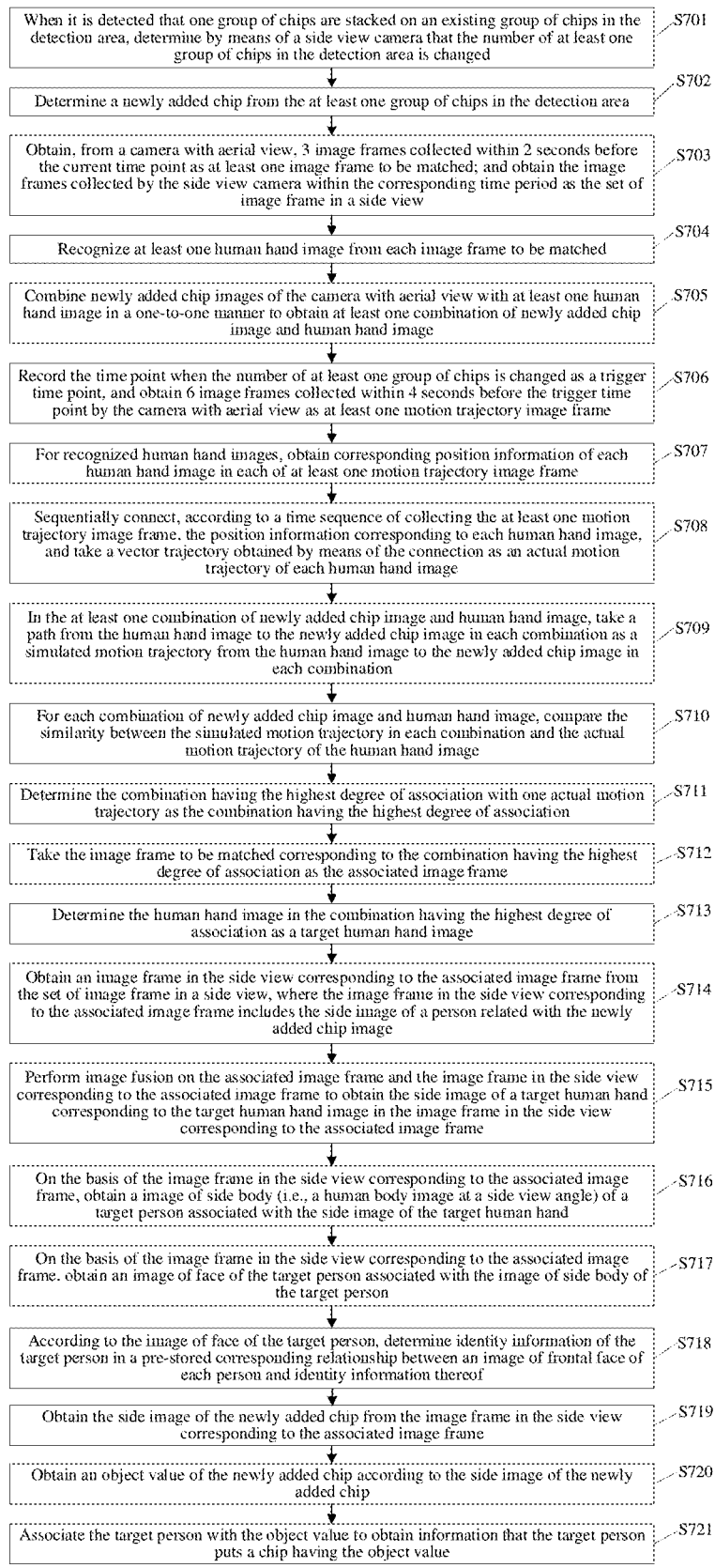
FIG. 6 is an optional flow chart V of the image recognition method provided by the embodiments of the present disclosure.

The embodiments of the present disclosure also provide an image recognition method that is suitable for the scene of intelligently monitoring to put or withdraw a chip. On the basis of the schematic diagram of the image recognition scene in FIG. 1, at least one group of target objects in the embodiments of the present disclosure may be at least one group of chips, and correspond to the target objects 300_1 to 300_n in FIG. 1; at least one intervention object may be at least one player participating in a game, certainly may also be a croupier, and corresponds to the intervention objects 400_1 to 400_n in FIG. 1; the image collection device located above the detection area may be the camera with aerial view, and corresponds to the image collection device 100 in FIG. 1; and the image collection device located on the side of the detection area may be the side view camera, and corresponds to the image collection devices 200_1 and 200_2 in FIG. 1. The image recognition method provided by the embodiments of the present disclosure may be as shown in FIG. 6, and includes the following operations S701 to S721.

At S701, when it is detected that one group of chips are stacked on an existing group of chips in the detection area again, it is determined by means of the side view camera that the number of at least one group of chips in the detection area is changed.

In the embodiments of the present invention, at least one group of target objects are at least one group of chips.

In the embodiments of the present invention, when one group of chips are stacked on an existing group of chips in the detection area again, it can be found by means of the side view camera that the number of chips included in the existing group of chips in the detection area is increased, and the state of at least one group of chips in the detection area is determined to be changed.

At S702, a newly added chip is determined from at least one group of chips in the detection area.

In the embodiments of the present invention, the changed object is the newly added chip.

At S703, 3 image frames collected within 2 seconds before the current time point are obtained by means of the camera with aerial view, and are taken as at least one image frame to be matched; and the image frame collected by the side view camera within the corresponding time period is obtained and taken as the set of image frame in the side view.

In the embodiments of the present disclosure, the first time period is 2 seconds.

At S704, at least one human hand image is recognized from each image frame to be matched.

In the embodiments of the present invention, at least one intervention part is at least one human hand image.

It can be understood that in the embodiments of the present disclosure, when one group of chips are stacked on the existing group of chips in the detection area again, the human hand necessarily stretches into the detection area, at least one image frame to be matched before the time point when the number of at least one group of chips is changed is captured by means of the camera with aerial view, and at least one human hand image may be recognized from at least one image frame to be matched, where at least one human hand image includes the human hand image where the chips are stacked, and may also include other human hand images. Therefore, it is needed to determine, from at least one human hand image, a human hand where the chips are stacked.

At S705, newly added chip images at the camera with aerial view are combined with at least one human hand image in the one-to-one manner to obtain the combination of at least one group of newly added chip images and the human hand image.

In the embodiments of the present disclosure, the newly added chip images are combined with at least one human hand image in the one-to-one manner, and it is guaranteed that the newly added chip images are combined with each of at least one human hand image only once to obtain the combination of at least one group of newly added chip images and the human hand image.

At S706, the time point when the number of at least one group of chips is changed is marked as the trigger time point, and 6 image frames collected within 4 seconds before the trigger time point are obtained by means of the camera with aerial view and taken as at least one motion trajectory image frame.

In the embodiments of the present disclosure, the second time period is 4 seconds.

At S707, for recognized human hand images, the corresponding position information of each human hand image in each of at least one motion trajectory image frame is obtained.

In the embodiments of the present disclosure, for one human hand image, 6 pieces of position information corresponding to the human hand image may be obtained from 6 motion trajectory image frames; and for the recognized human hand images, the respective corresponding position information of the recognized human hand images in each of at least one motion trajectory image frame is obtained.

At S708, according to a time sequence of collecting at least one motion trajectory image frame, the position information corresponding to each human hand image is sequentially connected, and the vector trajectory obtained by means of the connection is taken as the actual motion trajectory of each human hand image.

In the embodiments of the present disclosure, the time sequence of at least one motion trajectory image frame is the time sequence of collecting at least one motion trajectory image frame.

At S709, in the combinations of at least one group of newly added chip images and the human hand image, a path from the human hand image to the newly added chip image in each combination is taken as the simulated motion trajectory from the human hand image to the newly added chip image in each combination.

At S710, for the combination of each newly added chip image and the human hand image, the similarity between the simulated motion trajectory in each combination and the actual motion trajectory of the human hand image is compared.

In the embodiments of the present disclosure, for each of the combinations of at least one group of newly added chip images and the human hand image, the similarity between each actual motion trajectory and each simulated motion trajectory may be compared by using the same method.

At S711, the combination having the highest degree of association with one actual motion trajectory is determined as the combination having the highest degree of association.

At S712, the image frame to be matched corresponding to the combination having the highest degree of association is taken as the associated image frame.

At S713, the human hand image in the combination having the highest degree of association is determined as a target human hand image.

At S714, the image frame in the side view corresponding to the associated image frame is obtained from the set of image frame in the side view, and the image frame in the side view corresponding to the associated image frame includes the side image of the person (one player or dealer) related with the newly added chip image.

The side image in the embodiments of the present disclosure also is the image at the side view angle relate to the image at a top view angle.

In the embodiments of the present disclosure, the image frame in the side view corresponding to the associated image frame is the image frame that is collected with the side view camera and synchronized with the associated image frame.

At S715, image fusion is performed on the associated image frame and the image frame in the side view corresponding to the associated image frame to obtain the side image of a target human hand corresponding to the target human hand image in the image frame in the side view corresponding to the associated image frame.

In the embodiments of the present invention, the side view image of the target intervention part is the side image of the target human hand.

In the embodiments of the present disclosure, image fusion is performed on the associated image frame and the image frame in the side view corresponding to the associated image frame, and image information association is performed on the human hand image of the associated image frame at the bird's eye view and the human hand image of the side view image at the side view angle to obtain the corresponding image of the target human hand image in the image frame in the side view corresponding to the associated image frame at the bird's eye view, i.e., the side image of the target human hand.

At S716, the image of side body (i.e., the human body image at the side view angle) of a target player associated with the side image of the target human hand is obtained on the basis of the image frame in the side view corresponding to the associated image frame.

In the embodiments of the present disclosure, the image frame in the side view corresponding to the associated image frame includes the side image of the human body of at least one person (the player or the dealer), and includes the side human hand image of at least one person, the side face image of at least one person, and the image of side body of at least one person, where the side human hand image, the side face image, and the image of side body of the same person are a whole associated with each other. On the basis of the image frame in the side view corresponding to the associated image frame, the side image of the person to which the side image of the target human hand belongs can be found, so that the image of side body of the target person associated with the side image of the target person is obtained.

At S717, on the basis of the image frame in the side view corresponding to the associated image frame, the face image of the target person associated with the image of side body of the target person is obtained.

In the embodiments of the present invention, the side view image of the target intervention object is the side face image of the target person.

In the embodiments of the present disclosure, after the image of side body of the target person is obtained, the image of side body of the target person is associated to the face image of the target person continuously based on the association relationship between the image of side body and the face image in the image frame in the side view corresponding to the associated image frame.

At S718, according to the face image of the target person and a pre-stored corresponding relationship between images of intervention objects and identity information of the intervention objects, the identity information of the target person is determined.

In the embodiments of the present invention, the pre-stored corresponding relationship between images of intervention objects and identity information of the intervention objects is the pre-stored corresponding relationship between the image of frontal face of each person and the identity information of the player.

It can be understood that by associating the target human hand image to the side image of the target human hand at the side view angle, and according to the association relationship between the human hand, the human body and the human face in the image frame in the side view corresponding to the associated image frame, associating the side image of the target human hand to the image of side body of the target person, the face image of the target person is further associated according to the image of side body of the target player, and matching is performed according to the face image of the target person and the pre-stored image of frontal face of at least one person, so that the target human hand image obtained at the bird's eye view and associated with the changed object is associated with the frontally collected image of frontal face of the target player, and the identity identification of the target person to which the changed object belongs is completed.

At S719, the side image of the newly added chip is obtained from the image frame in the side view corresponding to the associated image frame.

At S720, the object value of the newly added chip is obtained according to the side image of the newly added chip.

In the embodiments of the present disclosure, the newly added chips include at least one chip having different colors or figures; each color and figure of the chips represent different chip values; and the object value of the newly added chip can be obtained according to the side image of the newly added chip.

At S721, the target person is associated with the object value to obtain the information that the target person puts the chip of the object value.

It can be understood that in the embodiments of the present disclosure, the situation that the new chips are stacked on the existing group of chips in the detection area can be monitored by means of the side view camera, so that the situation of failing to effectively monitor the stacking of the chips by means of the camera with aerial view is avoided; meanwhile, the target human hand image is determined by means of the motion trajectory from the human hand to the chip at the camera with aerial view, so that it is avoided that a distortion occurs in the motion trajectory, which is obtained by means of the side view camera, from the human hand to the newly added chip, and that the association between the newly added chip and the target human hand image is inaccurate; furthermore, the image of side body of the player is obtained by means of the side view camera, information fusion is performed on the target human hand image at the bird's eye view and the image of side body of the player at the side view angle, and the association between the target human hand image and the face image of the target person is established, so that by associating the face image of the target person to the pre-stored image of frontal face of at least one person, the target human hand image associated with the changed object from the bird's eye view can be associated to the image of frontal face of the player, and finally, the accuracy of recognizing the identity information of the person to which the changed object belongs is improved.

Figure 7:
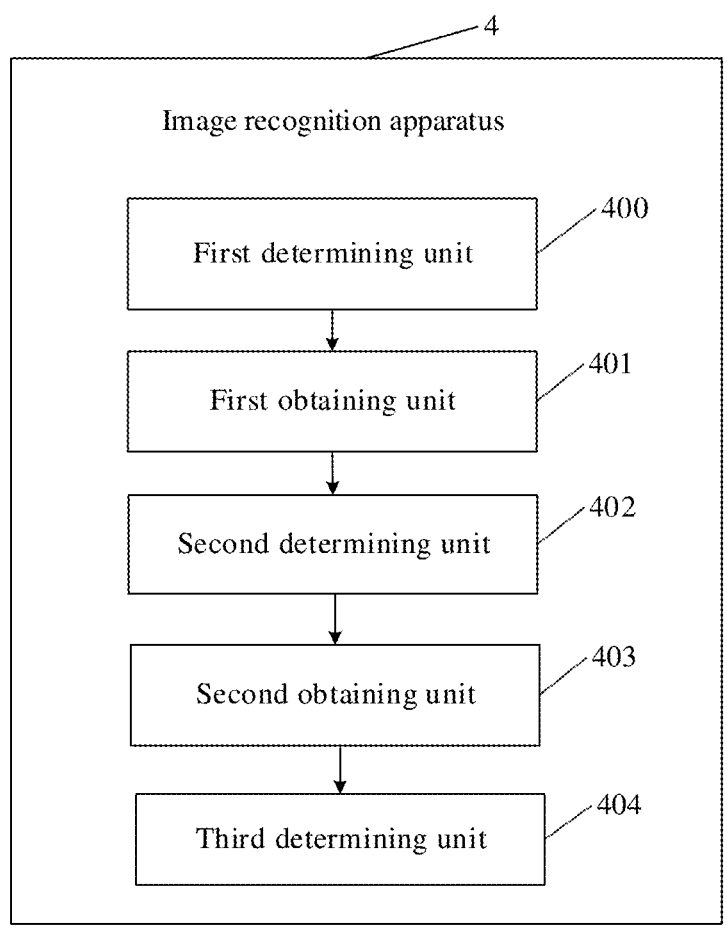
FIG. 7 is a schematic structural diagram I of the image recognition apparatus provided by the embodiments of the present disclosure.

The embodiments of the present disclosure provide an image recognition apparatus corresponding to the image recognition method; FIG. 7 is a schematic structural diagram I of the image recognition apparatus provided by the embodiments of the present disclosure; and as shown in FIG. 7, the image recognition apparatus 4 includes the first determining unit 400, the first obtaining unit 401, the second determining unit 402, the second obtaining unit 403, and the third determining unit 404.

The first determining unit 400 is configured to determine the changed object according to the change of states of at least one group of target objects in the detection area.

The first determining unit 401 is configured to obtain the set of image frame in the side view consisting of the image frames in the side view that are collected within the first preset time period before the states of at least one group of target objects in the detection area are changed, and at least one image frame to be matched, where at least one image frame to be matched is obtained by collecting an image of the detection area by the image collection device located above the detection area, and the image frames in the side view are obtained by collecting images of the detection area by the image collection device located on the side of the detection area.

The second determining unit 402 is configured to determine the associated image frame from at least one image frame to be matched, where the associated image frame includes the intervention part having the highest degree of association with the changed object.

The second obtaining unit 403 is configured to obtain the image frame in the side view corresponding to the associated image frame from the set of image frame in the side view, where the image frame in the side view corresponding to the associated image frame includes the intervention part having the highest degree of association with the changed object, and at least one intervention object.

The third determining unit 404 is configured to determine, on the basis of the associated image frame and the image frame in the side view corresponding to the associated image frame, the target intervention object having the highest degree of association with the changed object from at least one intervention object.

In some embodiments, the image recognition apparatus 4 further includes a third obtaining unit, a fourth obtaining unit, and a first associating unit.

The third obtaining unit is configured to obtain a side image of the changed object from the image frame in the side view corresponding to the associated image frame.

The fourth obtaining unit is configured to obtain an object value of the changed object according to the side image of the changed object, where the object value is the sum of values of at least one sub changed object constituting the changed object, the side image of the changed object includes the side image of each of at least one sub changed object, and the side image of each of at least one sub changed object represents different values.

The first associating unit is configured to associate the target intervention object and the object value.

In some embodiments, the second determining unit 402 includes a recognizing unit, a combining unit, a first determining sub unit, and a second determining sub unit.

The recognizing unit is configured to recognize at least one intervention part from each of at least one image frame to be matched, where the at least one intervention part is a part of the at least one intervention object which appears in one image frame to be matched.

The combining unit is configured to combine the changed object and the recognized intervention part in the one-to-one manner to obtain at least one combination of changed object and intervention part.

The first determining sub unit is configured to determine the combination having the highest degree of association from the at least one combination of changed object and intervention part, where the intervention part in the combination having the highest degree of association is the target intervention part.

The second determining sub unit is further configured to take the image frame to be matched in which the intervention part in the combination having the highest degree of association is located as the associated image frame.

In some embodiments, the third determining unit 404 includes a fusing unit, a second associating unit, and a third determining sub unit.

The fusing unit is configured to perform image fusion on the associated image frame and the image frame in the side view corresponding to the associated image frame to obtain a side view image of the target intervention part, where the side view image of the target intervention part is the image of the target intervention part in the image frame in the side view corresponding to the associated image frame.

The second associating unit is configured to obtain, on the basis of the image frame in the side view corresponding to the associated image frame, the image in the side view of the target intervention object associated with the image in the side view of the target intervention part, where the image frame in the side view corresponding to the associated image frame includes the image in the side view of each of at least one intervention object.

The third determining sub unit is configured to determine, according to the image in the side view of the target intervention object and a pre-stored corresponding relationship between images of intervention objects and identity information of the intervention objects, identity information of the target intervention object.

In some embodiments, the first determining sub unit further includes:

a fifth obtaining unit, configured to obtain the distances between the changed objects and the intervention parts in each of the at least one combination of changed object and intervention part;

the fourth determining sub unit, further configured to determine the minimum distance from the distances; and the fifth determining sub unit, further configured to take the combination of the changed object and the intervention part corresponding to the minimum distance as the combination having the highest degree of association.

In some embodiments, the fourth determining sub unit is configured to:

perform inverse ratio calculation on the distance to obtain the calculation results of each of the distances; and determine the maximum calculation result from the calculation results, and determine the distance corresponding to the maximum calculation result as the minimum distance.

In some embodiments, the first determining sub unit further includes a sixth obtaining unit, a seventh obtaining unit, a comparing unit, and a sixth determining sub unit, where the sixth obtaining unit is configured to obtain the actual motion trajectory of each of the recognized intervention parts;

the seventh obtaining unit is configured to obtain, in the at least one combination of changed object and intervention part, the simulated motion trajectory from the intervention part to the changed object in each combination, where the simulated motion trajectory from the intervention part to the changed object in one combination is the trajectory connecting the intervention part and the changed object in the combination;

the comparing unit is configured to compare the similarity between each actual motion trajectory and each simulated motion trajectory; and the sixth determining sub unit is configured to determine the combination of the changed object and the intervention part corresponding to the simulated motion trajectory having the highest similarity with the actual motion trajectory as the combination having the highest degree of association.

In some embodiments, the sixth obtaining unit includes an eighth obtaining unit, a ninth obtaining unit, a tenth obtaining unit, and a connecting unit, where the eighth obtaining unit is configured to obtain the trigger time point when the state of the target object is changed;

the ninth obtaining unit is configured to obtain at least one motion trajectory image frame that is collected within the second preset time period before the trigger time point, where the at least one motion trajectory image frame is obtained by the image collection device located above the detection area;

the tenth obtaining unit is configured to obtain the corresponding position information of each recognized intervention part in at least one motion trajectory image frame; and the connecting unit is configured to perform, according to a time sequence of at least one motion trajectory image frame, vectorization connection on the position information to obtain the actual motion trajectory of each recognized intervention part.

In some embodiments, the image recognition apparatus 4 further includes a first monitoring unit, where the first monitoring unit is configured to determine, when it is monitored, by means of the image collection device located above the detection area, that one new group of target objects appear in the detection area or that any of the at least one group of previous target objects in the detection area disappear, that the state of at least one group of target objects in the detection area is changed.

In some embodiments, at least one group of target objects are formed by stacking at least one sub object, and the image recognition apparatus 4 further includes a second monitoring unit, where the second monitoring unit is configured to determine, when it is monitored, by means of the image collection device located on the side of the detection area, that the number or the appearance of sub objects included in any of the at least one group of target objects is changed, that the states of the at least one group of target objects in the detection area are changed.

It should be noted that in actual application, the first determining unit 400, the first obtaining unit 401, the second determining unit 402, the second obtaining unit 403, and the third determining unit 404 may be realized by means of the processor 54 located at the image recognition apparatus 2, and specifically are realized by a Central Processing Unit (CPU), a Microprocessor Unit (MPU), a Digital Signal Processing (DSP), or a Field Programmable Gate Array (FPGA).

Figure 8:
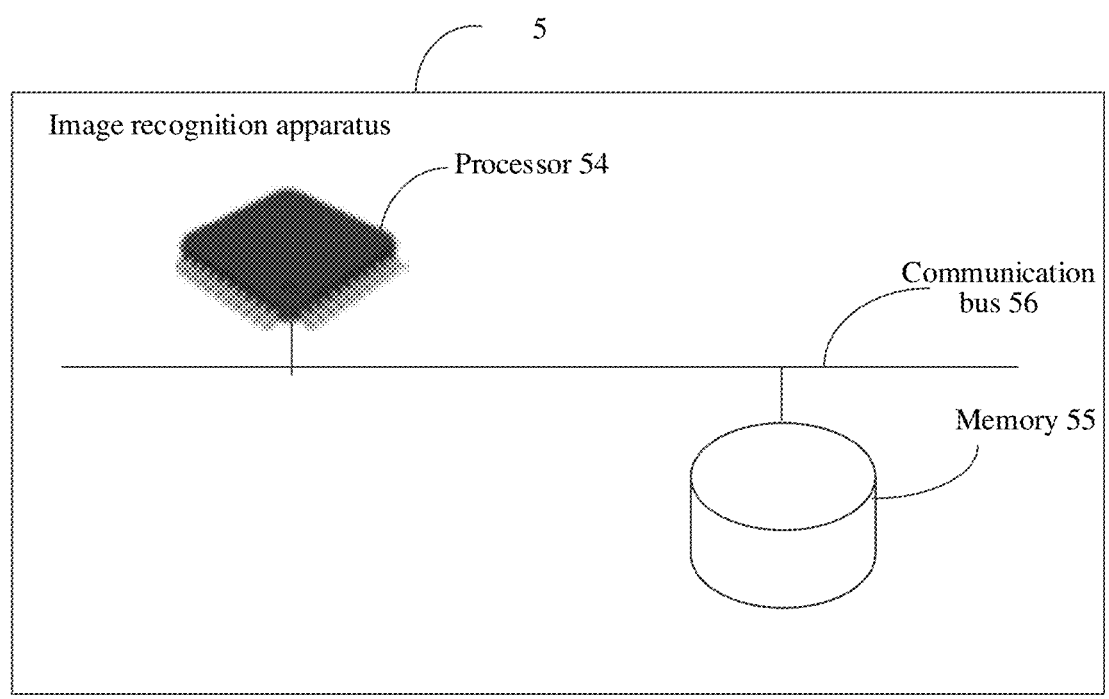
FIG. 8 is a schematic structural diagram II of the image recognition apparatus provided by the embodiments of the present disclosure.

The embodiments of the present disclosure provide an image recognition apparatus corresponding to the image recognition method; FIG. 8 is a schematic structural diagram II of the image recognition apparatus provided by the embodiments of the present disclosure; as shown in FIG. 8, the image recognition apparatus 5 includes the processor 54, the memory 55, and the communication bus 56; the memory 55 communicates with the processor 54 by means of the communication bus 56; the memory 55 stores one or more programs that may be executed by the processor 54; and if one or more programs are executed, the processor 54 executes the aforementioned any one image recognition method.

It can be understood that in the embodiments of the present disclosure, the image recognition apparatus can obtain the information of the target intervention part having higher accuracy from the bird's eye view, and by means of image fusion, combines the information of the target intervention part at the bird's eye view with the complete side information of the intervention object at the side view angle, so that the present disclosure realizes the association from the information of the target intervention part at the bird's eye view to the information of the target intervention object at the side view angle, further associating the pre-stored image information of the target intervention object, and improving the accuracy of recognizing the target intervention object.

The embodiments of the present disclosure provide a computer-readable storage medium, where the computer-readable storage medium stores one or more programs; one or more programs may be executed by one or more processors 54; and the image recognition method, as shown in the embodiments of the present disclosure, is realized when the program is executed by the processor 54.

A person skilled in the art should understand that the embodiments of the present disclosure may provide a method, a system or a computer program product. Therefore, the present disclosure may use the forms of hardware embodiments, software embodiments, or the embodiments of combining software and hardware aspects. Moreover, the present disclosure may use the form of the computer program product implemented over one or more computer usable storage mediums (including but not limited to a disk memory and an optical memory, etc.) that include a computer usable program code.

The present disclosure is described with reference to flowcharts and/or block diagrams of methods, devices (systems), and computer program products of the embodiments of the present disclosure. It should be understood that a computer program instruction is configured to implement each flow and/or block in the flowcharts and/or block diagrams, and the combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation operations are executed on the computer or other programmable data processing devices to generate computer implemented processing, and thus the instruction executed on the computer or other programmable data processing devices provides the operations for implementing the functions specified in one or more flows in the flowchart and/or one or more blocks in the block diagram.

The foregoing descriptions are merely preferred embodiments of the present disclosure, but are not intended to limit the scope of protection of the present disclosure.

The invention claimed is:

1. An image recognition method, comprising: determining a changed object according to a change of states of at least one group of target objects in a detection area; obtaining at least one image frame to be matched and a set of image frames in a side view consisting of image frames in the side view that are collected within a first preset time period before states of the at least one group of target objects in the detection area are changed, wherein the at least one image frame to be matched is obtained by collecting at least one image of the detection area by an image collection device located above the detection area, and the image frames in the side view are obtained by collecting images of the detection area by an image collection device located on a side of the detection area; determining an associated image frame from the at least one image frame to be matched, wherein the associated image frame comprises an intervention part having a highest degree of association with the changed object; obtaining an image frame in the side view corresponding to the associated image frame from the set of image frames in the side view, wherein the image frame in the side view corresponding to the associated image frame comprises the intervention part having the highest degree of association with the changed object, and at least one intervention object; and determining, according to the associated image frame and the image frame in the side view corresponding to the associated image frame, a target intervention object having the highest degree of association with the changed object from the at least one intervention object.

2. The method according to claim 1, wherein after the determining, according to the associated image frame and the image frame in the side view corresponding to the associated image frame, the target intervention object having the highest degree of association with the changed object from the at least one intervention object, the method further comprises:
  obtaining a side image of the changed object from the image frame in the side view corresponding to the associated image frame;
  obtaining an object value of the changed object according to the side image of the changed object, wherein the object value is a sum of values of at least one sub changed object constituting the changed object, the side image of the changed object comprises a side image of each of the at least one sub changed object, and the side image of each of the at least one sub changed object represents different values; and
  associating the target intervention object with the object value.

3. The method according to claim 1, wherein the determining the associated image frame from the at least one image frame to be matched comprises:
  recognizing at least one intervention part from each of the at least one image frame to be matched, wherein the at least one intervention part is a part of the at least one intervention object which appears in one image frame to be matched;
  combining the changed object and the recognized at least one intervention part in a one-to-one manner to obtain at least one combination of changed object and intervention part;
  determining a combination having a highest degree of association from the at least one combination of changed object and intervention part, wherein an intervention part in the combination having the highest degree of association is a target intervention part; and
  taking an image frame to be matched in which the intervention part in the combination having the highest degree of association is located as the associated image frame.

4. The method according to claim 3, wherein the determining, according to the associated image frame and the image frame in the side view corresponding to the associated image frame, the target intervention object having the highest degree of association with the changed object from the at least one intervention object comprises:
  performing image fusion on the associated image frame and the image frame in the side view corresponding to the associated image frame to obtain an image in the side view of the target intervention part, wherein the image in the side view of the target intervention part is an image of the target intervention part in the image frame in the side view corresponding to the associated image frame;
  obtaining, according to the image frame in the side view corresponding to the associated image frame, an image in the side view of the target intervention object associated with the image in the side view of the target intervention part, wherein the image frame in the side view corresponding to the associated image frame comprises an image in the side view of each of the at least one intervention object; and
  determining, according to the image in the side view of the target intervention object and a pre-stored corresponding relationship between images of intervention objects and identity information of the intervention objects, identity information of the target intervention object.

5. The method according to claim 3, wherein the determining the combination having the highest degree of association from the at least one combination of changed object and intervention part comprises:
  obtaining distances between the changed object and the intervention part in each of the at least one combination of changed object and intervention part;
  determining a minimum distance from the distances; and
  taking the combination of changed object and intervention part corresponding to the minimum distance as the combination having the highest degree of association.

6. The method according to claim 3, wherein the determining the combination having the highest degree of association from the at least one combination of changed object and intervention part comprises:
  obtaining an actual motion trajectory of each of the recognized at least one intervention part;
  obtaining, in the at least one combination of changed object and intervention part, a simulated motion trajectory from the intervention part to the changed object in each of the at least one combination of changed object and intervention part, wherein the simulated motion trajectory from the intervention part to the changed object in one combination is a trajectory connecting the intervention part and the changed object in the combination;
  comparing a similarity between each actual motion trajectory and each simulated motion trajectory; and
  determining the combination of the changed object and the intervention part corresponding to the simulated motion trajectory having the highest similarity with the actual motion trajectory as the combination having the highest degree of association.

7. The method according to claim 6, wherein the obtaining the actual motion trajectory of each of the recognized at least one intervention part comprises:
  obtaining a trigger time point responsive to a state of the target object being changed;
  obtaining at least one motion trajectory image frame that is collected within a second preset time period before the trigger time point, wherein the at least one motion trajectory image frame is obtained by the image collection device located above the detection area;
  obtaining corresponding position information of each of the recognized at least one intervention part in the at least one motion trajectory image frame; and
  performing, according to a time sequence of the at least one motion trajectory image frame, vectorization connection on the position information to obtain the actual motion trajectory of each of the recognized at least one intervention part.

8. The method according to claim 1, wherein the change of states of the at least one group of target objects in the detection area comprises:
  responsive to monitoring, by means of the image collection device located above the detection area, that a new group of target objects appear in the detection area or that any of the at least one group of the target objects in the detection area disappear, determining that the states of the at least one group of target objects in the detection area are changed.

9. The method according to claim 1, wherein the at least one group of target objects are formed by stacking at least one sub object, and the change of states of the at least one group of target objects in the detection area comprises:
responsive to monitoring, by means of the image collection device located on the side of the detection area, that a number or an appearance of sub objects comprised in any of the at least one group of target objects is changed, determining that the states of the at least one group of target objects in the detection area are changed.

10. An image recognition apparatus, comprising a processor, a memory, and a communication bus, wherein the memory communicates with the processor by means of the communication bus; the memory stores one or more programs that are executable by the processor; and when the one or more programs are executed, the processor is configured to: determine a changed object according to a change of states of at least one group of target objects in a detection area; obtain at least one image frame to be matched and a set of image frames in a side view consisting of image frames in the side view that are collected within a first preset time period before states of the at least one group of target objects in the detection area are changed, wherein the at least one image frame to be matched is obtained by collecting at least one image of the detection area by an image collection device located above the detection area, and the image frames in the side view are obtained by collecting images of the detection area by an image collection device located on a side of the detection area; determine an associated image frame from the at least one image frame to be matched, wherein the associated image frame comprises an intervention part having a highest degree of association with the changed object; obtain an image frame the side view corresponding to the associated image frame from the set of image frames in the side view, wherein the image frame in the side view corresponding to the associated image frame comprises the intervention part having the highest degree of association with the changed object, and at least one intervention object; and determine, according to the associated image frame and the image frame in the side view corresponding to the associated image frame, a target intervention object having the highest degree of association with the changed object from the at least one intervention object.

11. The image recognition apparatus according to claim 10, wherein the processor is further configured to:
obtain a side image of the changed object from the image frame in the side view corresponding to the associated image frame;
obtain an object value of the changed object according to the side image of the changed object, wherein the object value is a sum of values of at least one sub changed object constituting the changed object, the side image of the changed object comprises a side image of each of the at least one sub changed object, and the side image of each of the at least one sub changed object represents different values; and
associate the target intervention object and the object value.

12. The image recognition apparatus according to claim 10, wherein the processor is specifically configured to:
recognize at least one intervention part from each of at least one image frame to be matched, wherein the at least one intervention part is a part of the at least one intervention object which appears in one image frame to be matched;
combine the changed object and the recognized at least one intervention part in a one-to-one manner to obtain at least one combination of changed object and intervention part;
determine a combination having a highest degree of association from the at least one combination of changed object and intervention part, wherein an intervention part in the combination having the highest degree of association is a target intervention part; and
take an image frame to be matched in which the intervention part in the combination having the highest degree of association is located as the associated image frame.

13. The image recognition apparatus according to claim 12, wherein the processor is specifically configured to:
perform image fusion on the associated image frame and the image frame in the side view corresponding to the associated image frame to obtain an image in the side view of the target intervention part, wherein the image in the side view of the target intervention part is an image of the target intervention part in the image frame in the side view corresponding to the associated image frame;
obtain, according to the image frame in the side view corresponding to the associated image frame, an image in the side view of the target intervention object associated with the image in the side view of the target intervention part, wherein the image frame in the side view corresponding to the associated image frame comprises an image in the side view of each of the at least one intervention object; and
determine, according to the image in the side view of the target intervention object and a pre-stored corresponding relationship between images of intervention objects and identity information of the intervention objects, identity information of the target intervention object.

14. The image recognition apparatus according to claim 12, wherein the processor is specifically configured to:
obtain distances between the changed objects and the intervention parts in each of the at least one combination of changed object and intervention part;
determine a minimum distance from the distances; and
take the combination of changed object and intervention part corresponding to the minimum distance as the combination having the highest degree of association.

15. The image recognition apparatus according to claim 12, wherein the processor is specifically configured to:
obtain an actual motion trajectory of each of the recognized at least one intervention parts;
obtain, in the at least one combination of changed object and intervention part, a simulated motion trajectory from the intervention part to the changed object in each of the at least one combination of changed object and intervention part, wherein the simulated motion trajectory from the intervention part to the changed object in one combination is a trajectory connecting the intervention part and the changed object in the combination;
compare a similarity between each actual motion trajectory and each simulated motion trajectory; and
determine the combination of the changed object and the intervention part corresponding to the simulated motion trajectory having the highest similarity with the actual motion trajectory as the combination having the highest degree of association.

16. The image recognition apparatus according to claim 15, wherein the processor is specifically configured to:
  obtain a trigger time point responsive to a state of the target object being changed;
  obtain at least one motion trajectory image frame that is collected within a second preset time period before the trigger time point, wherein the at least one motion trajectory image frame is obtained by the image collection device located above the detection area;
  obtain corresponding position information of each of the recognized at least one intervention part in the at least one motion trajectory image frame; and
  perform, according to a time sequence of the at least one motion trajectory image frame, vectorization connection on the position information to obtain the actual motion trajectory of each of the recognized at least one intervention part.

17. The image recognition apparatus according to claim 10, wherein the processor is further configured to:
  determine, responsive to monitoring, by means of the image collection device located above the detection area, that a new group of target objects appear in the detection area or that any of the at least one group of the target objects in the detection area disappear, that the states of the at least one group of target objects in the detection area are changed.

18. The image recognition apparatus according to claim 10, wherein the at least one group of target objects are formed by stacking at least one sub object, and the processor is further configured to:
  determine, responsive to monitoring, by means of the image collection device located on the side of the detection area, that a number or an appearance of sub objects comprised in any of the at least one group of target objects is changed, that the states of the at least one group of target objects in the detection area are changed.

19. A non-transitory computer-readable storage medium, wherein the non-transitory computer-readable storage medium stores one or more programs, and the one or more programs are executable by one or more processors to implement the following operations: determining a changed object according to a change of states of at least one group of target objects in a detection area; obtaining at least one image frame to be matched and a set of image frames in a side view consisting of image frames in the side view that are collected within a first preset time period before states of the at least one group of target objects in the detection area are changed, wherein the at least one image frame to be matched is obtained by collecting at least one image of the detection area by an image collection device located above the detection area, and the image frames in the side view are obtained by collecting images of the detection area by an image collection device located on a side of the detection area; determining an associated image frame from the at least one image frame to be matched, wherein the associated image frame comprises an intervention part having a highest degree of association with the changed object; obtaining an image frame in the side view corresponding to the associated image frame from the set of image frames in the side view, wherein the image frame in the side view corresponding to the associated image frame comprises the intervention part having the highest degree of association with the changed object, and at least one intervention object; and determining, according to the associated image frame and the image frame in the side view corresponding to the associated image frame, a target intervention object having the highest degree of association with the changed object from the at least one intervention object.

20. The non-transitory computer-readable storage medium according to claim 19, wherein after the determining, according to the associated image frame and the image frame in the side view corresponding to the associated image frame, the target intervention object having the highest degree of association with the changed object from the at least one intervention object, the operations further comprises:
  obtaining a side image of the changed object from the image frame in the side view corresponding to the associated image frame;
  obtaining an object value of the changed object according to the side image of the changed object, wherein the object value is a sum of values of at least one sub changed object constituting the changed object, the side image of the changed object comprises a side image of each of the at least one sub changed object, and the side image of each of the at least one sub changed object represents different values; and
  associating the target intervention object with the object value.

* * * * *